(12) United States Patent
Fassberg et al.

(10) Patent No.: US 9,066,529 B2
(45) Date of Patent: Jun. 30, 2015

(54) METHOD AND APPARATUS FOR FLAVORED ICE MAKING

(75) Inventors: Steven M. Fassberg, Boynton Beach, FL (US); Scott Harris, Boca Raton, FL (US); Neal Rosenblum, Hollywood, FL (US)

(73) Assignee: Brooklyn Water Enterprises, LLC, Delray Beach, FL (US)

( * ) Notice: Subject to any disclaimer, the term of this patent is extended or adjusted under 35 U.S.C. 154(b) by 953 days.

(21) Appl. No.: 13/236,918

(22) Filed: Sep. 20, 2011

(65) Prior Publication Data

US 2012/0277906 A1  Nov. 1, 2012

Related U.S. Application Data

(60) Provisional application No. 61/479,613, filed on Apr. 27, 2011.

(51) Int. Cl.
*F25C 5/08* (2006.01)
*A23G 9/04* (2006.01)
*F25C 1/04* (2006.01)

(52) U.S. Cl.
CPC . *A23G 9/045* (2013.01); *F25C 1/04* (2013.01); *F25C 2600/02* (2013.01); *F25C 2600/04* (2013.01); *F25D 2700/122* (2013.01)

(58) Field of Classification Search
CPC .. F25D 2700/122; F25C 1/04; F25C 2600/02; F25C 2600/04
USPC .......................... 62/66, 73, 135, 157
See application file for complete search history.

(56) References Cited

U.S. PATENT DOCUMENTS

| | | | |
|---|---|---|---|
| 3,837,587 A | 9/1974 | Walter et al. | 241/260.1 |
| 4,424,683 A * | 1/1984 | Manson | 62/135 |
| 5,163,300 A * | 11/1992 | Kato et al. | 62/71 |
| 5,230,448 A | 7/1993 | Strohmeyer et al. | 222/643 |
| 5,323,691 A | 6/1994 | Reese et al. | 99/275 |
| 5,958,481 A | 9/1999 | Hodges | 426/100 |
| 6,672,097 B1 | 1/2004 | Ashley | 62/340 |
| 2008/0066483 A1 | 3/2008 | Klier et al. | 62/342 |

* cited by examiner

*Primary Examiner* — Jonathan Bradford
(74) *Attorney, Agent, or Firm* — Akerman LLP

(57) ABSTRACT

A method and system may make iced beverages containing flavored ice cubes made from a flavored beverage. The method and system may include dynamically altering a freeze-cycle of an ice maker to account for various parameters, such as freezer temperature. When freezer temperature rises above a set-point temperature, the freeze-cycle may be stopped, and only resumed once the freezer temperature returns to back below the set-point temperature. The freeze-cycle may be dynamically lengthened by the amount of time that the freezer temperature remains above the set-point temperature. The set-point temperature may be substantially below the freezing point of the beverage, which in turn may be below the freezing point of water, to ensure that the beverage is frozen into ice cubes at the completion of the freeze-cycle. In one embodiment, the flavored beverage may have a non-clear color, such as coffee, and the flavored ice cubes are coffee ice cubes.

20 Claims, 10 Drawing Sheets

METHOD AND APPARATUS FOR FLAVORED ICE MAKING

CROSS-REFERENCE TO RELATED APPLICATION

This patent application claims priority to U.S. Provisional Application No. 61/479,613, filed Apr. 27, 2011, the entirety of which is incorporated by reference herein.

FIELD OF THE INVENTION

The present application relates to iced beverages. In particular, the present embodiments relate to making flavored ice and ice cubes.

BACKGROUND

Conventional drink mixers include those of U.S. Pat. No. 5,323,691 (entitled "Frozen Drink Mixer"); U.S. Pat. No. 3,837,587 (entitled "Combination Ice Crusher and Drink Mixer"); and U.S. Pat. No. 5,230,448 (entitled "Complete System Self-Contained Drink and Ice Dispensing"). Conventional methods of producing ice drinks include that of U.S. Publication No. 2008/0066483 (entitled "Devices and Methods for Producing Controlled Flavored Ice Drinks").

Further, conventional methods of making flavored ice cubes are disclosed in U.S. Pat. No. 5,958,481 (entitled "Method of Making Novelty Ice Cubes"); and U.S. Pat. No. 6,672,097 (entitled "Flavored Ice Cartridge Dispenser for Ice Maker"). However, traditional ice makers and methods may suffer from various drawbacks, such as producing poor quality ice.

SUMMARY

A method and system may provide for the making of an iced beverage, the iced beverage may include a drink portion and a frozen portion. The drink portion and the frozen portion may comprise the same formula or concentration of various ingredients. The drink portion may be in liquid form, while the frozen portion may be ice in form, such as ice cubes of different shapes, including cubes, crescents, toroids, etc. The frozen portion may be made from the same liquid formula as the drink portion, but be frozen, i.e., ice. As a result, as the flavored ice cubes, once in the drink portion, melt in a drinking container over time as a person drinks the iced beverage, the drink portion in liquid form may not become diluted—as may be the case if the ice cubes were made from a liquid formula different from that of the drink portion, such as being made of ordinary tap water or other non-flavored water.

The ice making system may make flavored ice cubes out of a flavored, liquid formula. The flavored, liquid formula may have a color associated with it other than the clear "color" of tap or bottled water. The flavored, liquid formula may be a water-based liquid, but with flavoring and/or coloring, such as coffee, tea, orange juice, tomato juice, fruit juice, vegetable juice, lemonade, soda, milk, chocolate milk, and/or other colored liquids. In one embodiment, the flavored, liquid formula may be coffee, and have a uniform brown, black, cream, milk, or other color throughout. The ice making system may make coffee ice cubes from liquid coffee alleviating and/or reducing uneven "browning" or other unsightly coloring of the resulting coffee ice cubes that may result from making colored and/or flavored ice cubes using certain conventional residential and/or commercial ice making techniques.

In one aspect, a computer-implemented method of dynamically controlling a freeze-cycle of an ice cube maker may be provided. The method may include actively monitoring one or more variables in real-time. The method may include starting the freeze-cycle of the ice cube maker to statically freeze a colored/flavored beverage held within an ice cube tray into colored/flavored ice cubes. The flavored beverage may have a non-clear color. The method may include counting a current length of the freeze-cycle via a processor or microcontroller; and receiving a freezer temperature generated by a temperature sensor. The freezer temperature may be a temperature of a freezer in which the ice cube maker is located. The method may include continuously and/or actively monitoring the freezer temperature generated by the temperature sensor via the processor in Teal-time. The processor may be configured to (1) stop counting the current length of the freeze-cycle when the freezer temperature rises above a set-point temperature, and (2) resume counting the current length of the freeze-cycle when the freezer temperature returns to back below the set-point temperature. Once the freeze-cycle is determined to be completed by the processor, the processor may energize a motor configured to turn a shaft with mechanical fingers that eject the colored ice cubes—made from the statically freezing of the flavored beverage during the freeze-cycle—from the ice cube tray and into an ice cube bin. The processor may further be configured to count an amount of time that the freezer temperature remains above the set-point temperature, and extend a total length of the freeze-cycle by the amount of time that the freezer temperature remained above the set-point temperature—not to exceed the max cycle time.

In another aspect, a computer-implemented method of dynamically controlling a freeze-cycle of an ice cube maker may be provided. The method may include actively monitoring one or more variables in real-time. The method may include detecting and/or determining that a previous freeze-cycle of the ice cube maker has been completed via a processor; and then refilling an ice cube tray with a colored beverage by opening a solenoid valve via the processor. The colored beverage may have a non-clear color. The method may include commencing a current freeze-cycle of the ice cube maker to statically freeze the colored beverage in the ice cube tray by having the processor start measuring a length of time of the current freeze-cycle. The method may include receiving a current freezer temperature generated by a temperature sensor; and continuously or actively monitoring the current freezer temperature generated by the temperature sensor via the processor. When the current freezer temperature rises above a user-adjustable, a processor determined, or other set-point, the processor may stop counting the length of time of the current freeze-cycle until the current freezer temperature returns to back below the set-point. At which point, the processor may resume the countdown and/or measuring the length of time of the current freeze-cycle until the length of time of the current freeze-cycle reaches a set total-freeze-time—indicating that the current freeze-cycle is completed and/or that the colored beverage in the ice cube tray has been statically frozen into colored ice cubes. The method may further include measuring an amount of time that the current freezer temperature remains above the set-point, and extending, via the processor, the set total-freeze-time that the current freeze-cycle is allowed to run by the amount of time that the current freezer temperature remains above the set-point.

In another aspect, an ice machine for dynamically changing a freeze-cycle of an ice maker for statically freezing ice cubes may be provided. The ice machine may actively monitor one or more variables in real-time. The ice machine may include a limit switch configured to indicate that a previous freeze-cycle of the ice maker is complete; a temperature sensor configured to generate a current freezer temperature of a freezer in which the ice maker is located; a solenoid valve configured to refill an ice cube tray with a colored beverage to be statically frozen into colored ice cubes; and a processor configured to actively monitor the limit switch and the current freezer temperature generated by the temperature sensor. When the limit switch indicates that a previous freeze-cycle of the ice maker is completed, the processor may open the solenoid valve to refill the ice cube tray with the colored beverage and start a current freeze-cycle of the ice maker by starting to count time upward from zero or down from a "max time" with a counter. Also, when the processor determines that the current freezer temperature received from the temperature sensor is above a set-point temperature, the processor may stop the counter. Once the processor subsequently determines that the current freezer temperature received from the temperature sensor has returned to back below the set-point temperature, the processor may then resume counting time with the counter until the counter reaches a predetermined total freeze-cycle length that indicates that the colored beverage in the ice cube tray has been statically frozen into colored ice cubes. The processor may also measure an amount of time that the current freezer temperature remains above the set-point temperature and extend the predetermined total freeze-cycle length by the amount of time that the current freezer temperature remained above the set-point temperature—up to the max cycle time.

Advantages of the present invention will become more apparent to those skilled in the art from the following description of the preferred embodiments of the invention which have been shown and described by way of illustration. As will be realized, the invention is capable of other and different embodiments, and its details are capable of modification in various respects. Accordingly, the drawings and description are illustrative in nature and not restrictive.

BRIEF DESCRIPTION OF THE DRAWINGS

There are shown in the drawings arrangements which are presently discussed, it being understood, however, that the invention is not limited to the precise arrangements and instrumentalities shown, wherein.

DETAILED DESCRIPTION OF THE INVENTION

Figure 1:
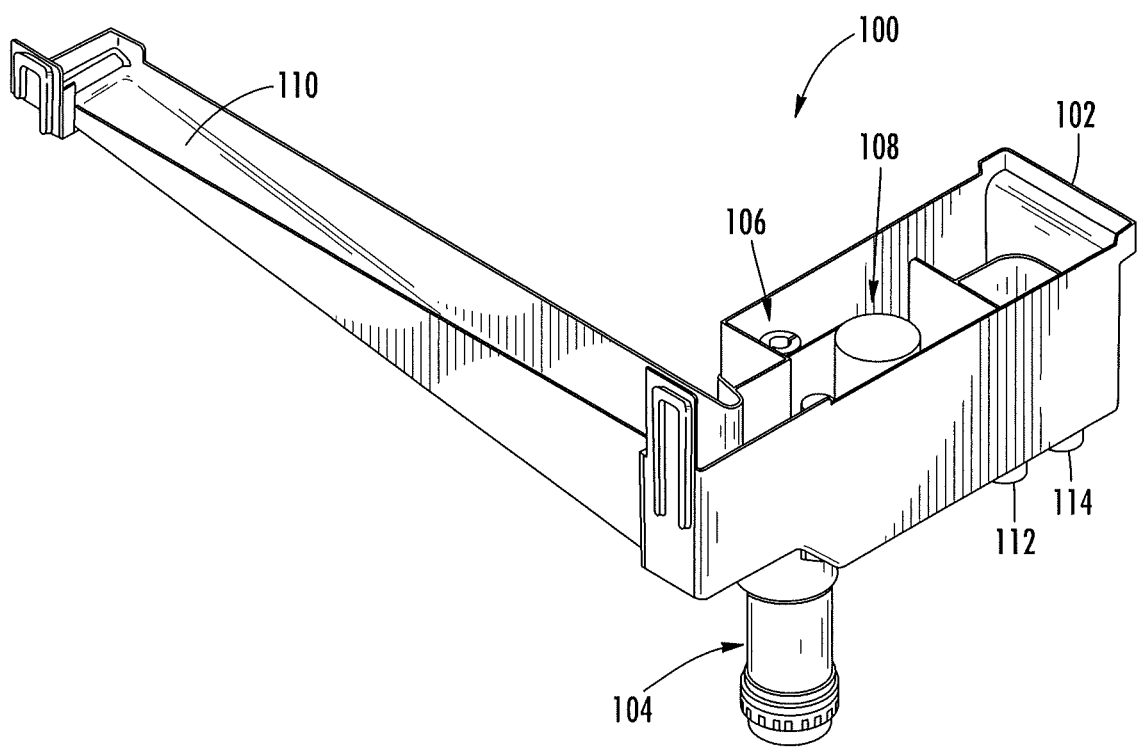
FIG. 1 illustrates a perspective view of an exemplary retrofit kit for dynamically freezing flavored ice cubes from a flavored beverage.

A method and apparatus may make iced beverages that contain a liquid portion of a flavored beverage and flavored ice cubes that are also made from the flavored beverage. As the flavored ice cubes of the flavored beverage melt while a user is drinking the iced beverage, the flavoring of the iced beverage, may remain constant or substantially constant. In other words, the flavoring of the iced beverage may not become diluted, as compared with using ordinary ice cubes made from ordinary, unflavored water. The flavored beverage may be colored, i.e., may have a non-clear color, such as tea, orange juice, tomato juice, fruit juice, vegetable juice, lemonade, soda, milk, chocolate milk, and/or other colored liquids. In one embodiment, the flavored beverage may be coffee, and the flavored ice cubes made by the ice machine may be coffee ice cubes.

During experimentation, making coffee ice cubes using some conventional techniques, including those used by typical commercial ice makers, may result in coffee ice cubes having uneven coloring due, at least in part, to freezing point depression. For instance, using conventional methods that employ dynamic freezing may result in coffee ice cubes being half clear and half brown, i.e., the "brown" coloring may only appear in approximately half, or another portion, of each ice cube. On the other hand, the present embodiments related to static freezing may enhance the uniform coloring of colored ice cubes made from flavored beverages, such as coffee and other colored beverages.

With the present embodiments, one or more ice makers that employ static freezing may be situated within a freezer in a serial manner. The ice makers may be located along, and/or in the vicinity of, the ceiling of the freezer. Each of the ice makers may be individually controlled by a dedicated controller/processing unit, such as a programmable logic controller (PLC) unit.

Each dedicated controller/processor may control the associated ice maker within its own freeze-cycle. In one aspect, each ice maker may be turned on in turn and placed into a freeze-cycle in a staggered manner, such as every two minutes. As a result, each ice maker may be running in a freeze-cycle that is offset by two minutes, or other time period, from the freeze-cycle of an adjacent ice maker within the freezer.

When each ice maker harvests its ice, such as into an ice holding bin or compartment located at the bottom of the freezer (i.e., gravity fed), the controller may direct that an ice cube tray or mold be automatically refilled with the beverage in liquid form. The controller may be configured to energize a solenoid valve. When the solenoid valve is energized, an associated valve stem may rise, opening the mechanical portion of the solenoid valve and allowing a beverage stored in a container to flow into the ice cube tray. The liquid may flow into the ice cube tray by gravity pull, or be pumped into the ice cube tray, such as by a Flojet™ pump.

Unlike conventional ice makers that may have mechanical thermostats precisely calibrated for freezing water, the present embodiments may be configured to freeze alternate types of flavored and/or colored beverages, such as coffee, tea, orange juice, tomato juice, fruit juice, vegetable juice, lemonade, soda, milk, chocolate milk, etc. The alternate types of beverages may have freezing points that are different than the 32° F. associated with the freezing point of water due to freezing point depression. For example, certain brews of coffee may have a lower freezing point than water, and thus may need to freeze longer than water to make coffee ice or coffee ice cubes.

Each dedicated controller may be may be integrated with, and control the operation of, mechanical ice making components, such as the motors, shafts, heaters, and valves discussed herein. More importantly, each controller may be configured to dynamically adjust the freeze-cycle of its respective ice maker based upon certain variables. Each controller may continuously and actively monitor one or more variables. Each controller may monitor and adjust the freeze-cycle of an ice maker based upon the temperature within the freezer, the defrost cycle of the freezer, the temperature outside of the freezer, and/or other parameters.

Generally, during use, when a door to a freezer is opened, typically warmer air, such as air at room temperature, may enter the freezer. The freezer may normally, i.e., with the freezer door closed, operate at a temperature below freezing, such as 10° F. The air outside of the freezer may be around room temperature, such as 75° F. Thus, while the freezer door is open, the temperature within the freezer may increase, perhaps substantially, depending upon the temperature difference between the inside and the outside of the freezer and the time that the door is left open.

Noted above, the temperature within the freezer may be continuously and actively monitored by the controller. A temperature sensor may measure the temperature within the freezer and send the freezer temperature sensed to each dedicated controller controlling an individual ice maker. If the temperature within the freezer goes above a certain set-point temperature, the freeze-cycle of an ice maker may be interrupted. The time that the temperature within the freezer remains above the set-point temperature may be counted or otherwise monitored by the controller and added back onto the freeze-cycle once the temperature within the freezer returns to back below the set-point temperature. In one embodiment, for every minute that the freezer temperature remains above the set-point temperature, the freeze-cycle may be extended by a minute, such as by adding a minute onto the length of a total freeze-cycle time limit or by subtracting a minute from the current freeze-cycle time (which is repeatedly compared with a total freeze-cycle time limit)—up to the max freeze cycle time. Other time increments may be used, As an example, if the ice maker is half-way through its freeze-cycle, typically the freezer temperature may be substantially below freezing (i.e., 32° F.). The freezer temperature may normally be as low as −5° F. to 10° F., or other temperature during operation with the freezer door shut. If the freezer door is then opened, the temperature within the freezer may almost immediately substantially rise to being above a set-point temperature, which may be below 32° F., but above normal operating temperature for the freezer. Subsequently, once the freezer door is closed, it may take several minutes for the freezer temperature to back return to normal operating temperature and below the set-point temperature. The controller may count the time that the freezer temperature remains above the given set-point temperature, and then add that time, or a portion thereof, onto the time remaining in the freeze-cycle once the freezer temperature returns to approximately the set-point temperature or back below the set-point temperature.

Once the freezer temperature returns back to approximately or below the set-point temperature, the controller may restart or resume normal operation in the freeze-cycle. The controller may resume counting the time that the ice maker is in the freeze-cycle, and when that time reaches a freeze-cycle time limit, the controller may determine that the freeze-cycle is completed and/or that the beverage should have been statically frozen into ice cubes.

An exemplary set-point temperature may be the freezing point of the beverage being frozen, such as below or slightly below the freezing point of water, 32° F. Preferably, the set-point temperature is below the freezing point of the beverage being frozen. With coffee, an exemplary set-point temperature may be 15° F. Setting the set-point temperature below, or substantially below, the freezing point of the beverage being frozen may ensure that the beverage in the ice cube tray is adequately frozen once the freeze-cycle is determined to have "timed out" by the controller.

In one aspect, a computer-implemented method of dynamically controlling a freeze-cycle of an ice cube maker may be provided. The method may include starting the freeze-cycle of the ice cube maker to statically freeze a flavored beverage held within an ice cube tray into colored ice cubes. The flavored beverage may have a non-clear color. The method may include counting a current length of the freeze-cycle via a processor; and receiving a freezer temperature generated by a temperature sensor. The freezer temperature may be a temperature of a freezer in which the ice cube maker is located.

The method may include continuously and actively monitoring the freezer temperature generated by the temperature sensor via the processor. The processor may be configured to (1) stop counting the current length of the freeze-cycle when the freezer temperature rises above a set-point temperature, and (2) resume counting the current length of the freeze-cycle when the freezer temperature returns to back below the set-point temperature. Once the freeze-cycle is determined to be completed by the processor, the processor may energize a motor configured to turn a shaft having mechanical fingers that eject colored ice cubes—made from the statically freezing of the flavored beverage during the freeze-cycle—from the ice cube tray and into an ice cube bin.

The processor may further be configured to count an amount of time that the freezer temperature remains above the set-point temperature, and extend a total length of the freeze-cycle by the amount of time that the freezer temperature remained above the set-point temperature (not to exceed a max freeze-cycle time). The set-point temperature may be below, or even well below, the freezing point of the flavored beverage, such as by 1° F., 2° F., 3° F., 4° F., 5° F., 10° F., 15° F., 20° F., 25° F. or more.

The flavored liquid may be colored, i.e., may have a non-clear color, such as tea, orange juice, tomato juice, fruit juice, vegetable juice, lemonade, soda, milk, chocolate milk, and/or other colored liquids. In one embodiment, the flavored liquid may be coffee and the colored ice cubes made from the flavored liquid may be coffee ice cubes. The computer-implemented method of dynamically controlling the static freeze-cycle of an ice cube maker may enhance a uniform coloring of the coffee ice cubes made from statically freezing the coffee in the ice tray, as compared with dynamic freezing techniques, As explained in more detail below, the controller/processor implementing the computer-implemented method of dynamically controlling a freeze-cycle of an ice cube maker may be further configured to control the opening of a solenoid valve to fill the ice cube tray with the flavored beverage. The processor may be further configured to control a heater to facilitate ejection of the colored ice cubes from the ice cube tray.

During experimentation, it was found that ice cubes made from flavored beverages, such as coffee, adhered to the ice tray (mold) more than water ice cubes. Thus, the processor may be configured to run the heater an extended length of time, as compared to the heating time required to eject water ice cubes, at or after the end of a freeze-cycle. Running the heater may allow the colored ice cubes to melt sufficiently such that the mechanical fingers on the shaft turned by the motor may push the colored ice cubes from the ice cube tray and into an ice cube bin, such as a bin located in the bottom of a freezer in which the ice maker is located, I. Initial Development Efforts Using Dynamic Freezing The present embodiments may be used to make ice from water. However, preferably, the flavored liquid discussed herein may comprise a wide range of colored and flavored liquids. The colored and flavored liquids may include coffee, tea, ice tea, fruit or vegetable juices (such as orange, apple, or tomato juice), and artificially flavored/colored fruit drinks (such as orange, grape, or strawberry flavored drinks). The colored and flavored liquids may also include soda, milk, concentrate-based beverages, and other colored and flavored beverages.

During experimentation, it was seen that attempting to make coffee ice cubes using conventional dynamic freezing techniques may lead to ice cubes having uneven browning or coloring. Initially, a retrofit kit for an existing commercial ice machine that employed "dynamic" freezing, i.e., making ice by continuously running water over a cold plate, was developed. The ice machine to which the retrofit kit is attached may make flavored ice from the flavored liquid (or flavored liquid formula) by repeatedly running the flavored liquid over a cold surface such that flavored ice comprising the flavored liquid is formed in layers on the cold surface. The horizontal, vertical, or inclined plate may be cooled to approximately equal to or less than 32° F.

The ice machine to which the retrofit kit is attached may be an under-the-counter ice machine. In one embodiment, the retrofit kit may be used with a Hoshizaki® under-the-counter ice machine. Alternatively, the retrofit kit may be used with residential and/or commercial ice makers, or an under-the-counter ice machine made by various other manufacturers. In addition to under-the-counter ice machines, the retrofit kit may also be used with other types of ice machines, such as refrigerators, freezers, cuter headers, flakers, storage bins, ice dispensers, ice makers, and other devices.

In another embodiment, the ice machine may be similar to that described by U.S. Pat. No. 4,341,087, which is incorporated herein in its entirety and discloses forming ice as water runs down an inclined plate, or similar to the under-the-counter ice machine described by U.S. Pub. No. 2009/0282855, which is also incorporated herein in its entirety. In one embodiment, the retrofit kit described herein may be used to replace a water reservoir of an existing ice machine, such as the water reservoir 65 shown in FIG. 6 of the fore-mentioned U.S. Pub. No, 2009/0282855. The retrofit kit may be used to replace and/or upgrade water reservoirs used by other types of ice machines as well.

The retrofit kit may include a fluid-holding reservoir configured to hold a flavored, liquid formula and feed the flavored, liquid formula into the ice machine. The retrofit kit may include a mixing attachment configured to be positioned inside of the fluid-holding reservoir. The mixing attachment may include an auger or moving component configured for continuously mixing the flavored, liquid formula in the interior of the fluid-holding reservoir while the ice machine is running in an ice-making cycle.

The retrofit kit may also include a motor pack configured to be positioned on an exterior, or outside the interior, of the fluid-holding reservoir. The motor pack may be interconnected with or otherwise coupled to the mixing attachment such that the motor pack, when energized, rotates the auger or other moving component of the mixing attachment.

A. Exemplary Retrofit Kit

FIG. 1 illustrates a perspective view of an exemplary retrofit kit for making flavored ice and ice cubes 100. The retrofit kit 100 may include a fluid-holding reservoir 102, a motor pack 104, a mixing attachment 106, a pump 108, an inclined slide 110, an inlet 112, and an outlet 114. The retrofit kit may 100 may include additional, fewer, or alternate components.

As shown in FIG. 1, the fluid-holding reservoir 102 may be configured to accept and hold a flavored liquid, such as coffee or another flavored drink. The fluid-holding reservoir 102 may be configured with, or interconnected to, an ice machine in a water or liquid tight manner, such as via seals, gaskets, and/or tight connections. The fluid-holding reservoir 102 may accept the flavored liquid via the inclined slide 110 or other manner.

The motor pack 104 may include a small electrical motor that provides rotation to a rotor or other moving component. The motor pack 104 may be attached to an outside or exterior of the fluid-holding reservoir 102. Attaching the motor pack 104 to an exterior of the fluid-holding reservoir 102 may facilitate maintenance to be performed on the motor pack 104 and replacing internal components, such as a motor, a rotor, electrical or mechanical components, and/or other components. The rotor of the motor pack 104 may run through a bottom surface of the fluid-holding reservoir 102 and into the interior portion of the fluid-holding reservoir 102. The rotor and/or the motor pack 104 may be directly or indirectly attached or coupled to the mixing attachment 106.

As a result, the motor pack 104 may be configured to cause the mixing attachment 106, or a component thereof on the interior of the fluid-holding reservoir 102, to rotate and/or otherwise move during an ice-making cycle to provide a stirring action. The mixing attachment 106 may be located within the interior of the fluid-holding reservoir 102, such as positioned in a portion of the fluid-holding reservoir 102 that is holding the flavored liquid.

The mixing attachment 106 may include a small cylindrical or tubular body. The exterior of the small cylindrical body may include a helical auger or other rotating surface(s). During use, the motor pack 104 may cause the helical auger of the mixing attachment 106 to rotate and continuously mix the flavored liquid during a freezing cycle being controlled by an attached ice machine.

The helical auger may cause a bottom portion of the flavored liquid being held in the vicinity of the bottom of the fluid-holding reservoir 102 to be raised toward the vicinity of the top of the fluid-holding reservoir 102 during the freezing cycle. Alternatively, the helical auger may cause a top portion of the flavored liquid being in the vicinity of the top of the fluid-holding reservoir 102 to be lowered toward the vicinity of the bottom of the fluid-holding reservoir 102 during the freezing cycle.

Figure 7:
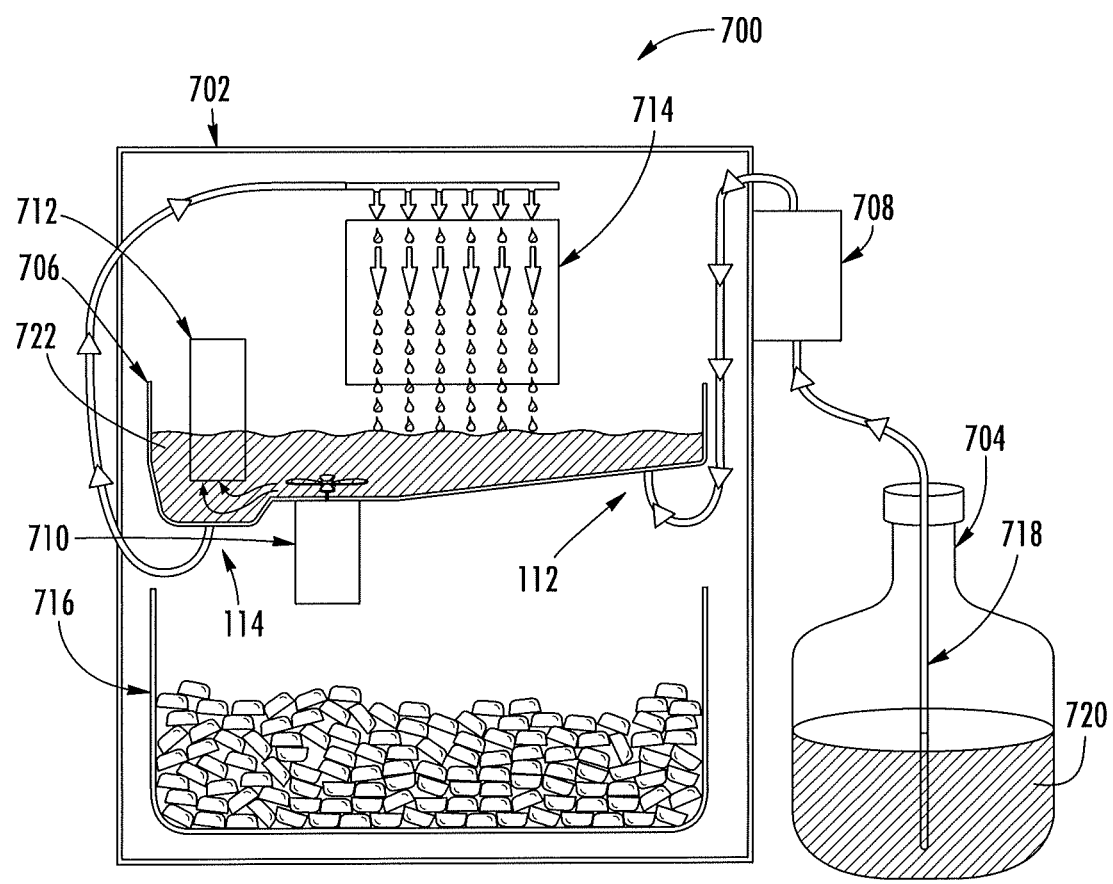
FIG. 7 illustrates an exemplary dynamic freezing process.

The continuously mixed flavored liquid may be fed into an ice machine, such as via an outlet 114 from the fluid-holding reservoir 102. The ice machine may continuously run the flavored liquid over a plate cooled to or below 32° F. In one aspect, the temperature of the plate may be adjusted to or below the freezing point of the flavored liquid. The plate may be a vertical, an angled, or a horizontal plate. Ice may build up slowly or gradually on the cooled plate as the flavored liquid runs over the cooled plate. The portion of the flavored liquid that reaches the end of the cooled plate without freezing may be recycled, such as in a continuous closed loop system. The recycled flavored liquid -may be run directly over the cooled plate again, or may first be sent into the fluid-holding reservoir 102 again for further mixing, such via an inlet 112 in the bottom of the fluid-holding reservoir 102. The inlet 112 may be attached to a hose or a piping that directs flavored liquid from the ice machine back into the fluid-holding reservoir 102, The flavored liquid may flow from the fluid-holding reservoir 102 through an outlet 114 and up to the top of a cold plate 714 (such as shown in FIG. 7) via an internal pump 712. The inlet 112 may allow for fluid to be pumped from an external reservoir 704 via an external pump, such as a Flojet™ pump 708, and into the internal reservoir 706. The fluid may be dispensed directly into the internal reservoir 706 by the Flojet™ pump 708, but alternatively may be dispensed through an inlet 112 and then into the internal reservoir 706.

In one embodiment, a pump 108 inside of the fluid-holding reservoir 102 may pump the flavored liquid being mixed toward and into the attached ice machine via the outlet 114. The outlet 114 may be in the bottom of the fluid-holding reservoir 102. The outlet 114 may be attached to a hose or a piping that directs the flavored liquid being mixed into the ice machine. Other configurations may be used.

Figure 2:
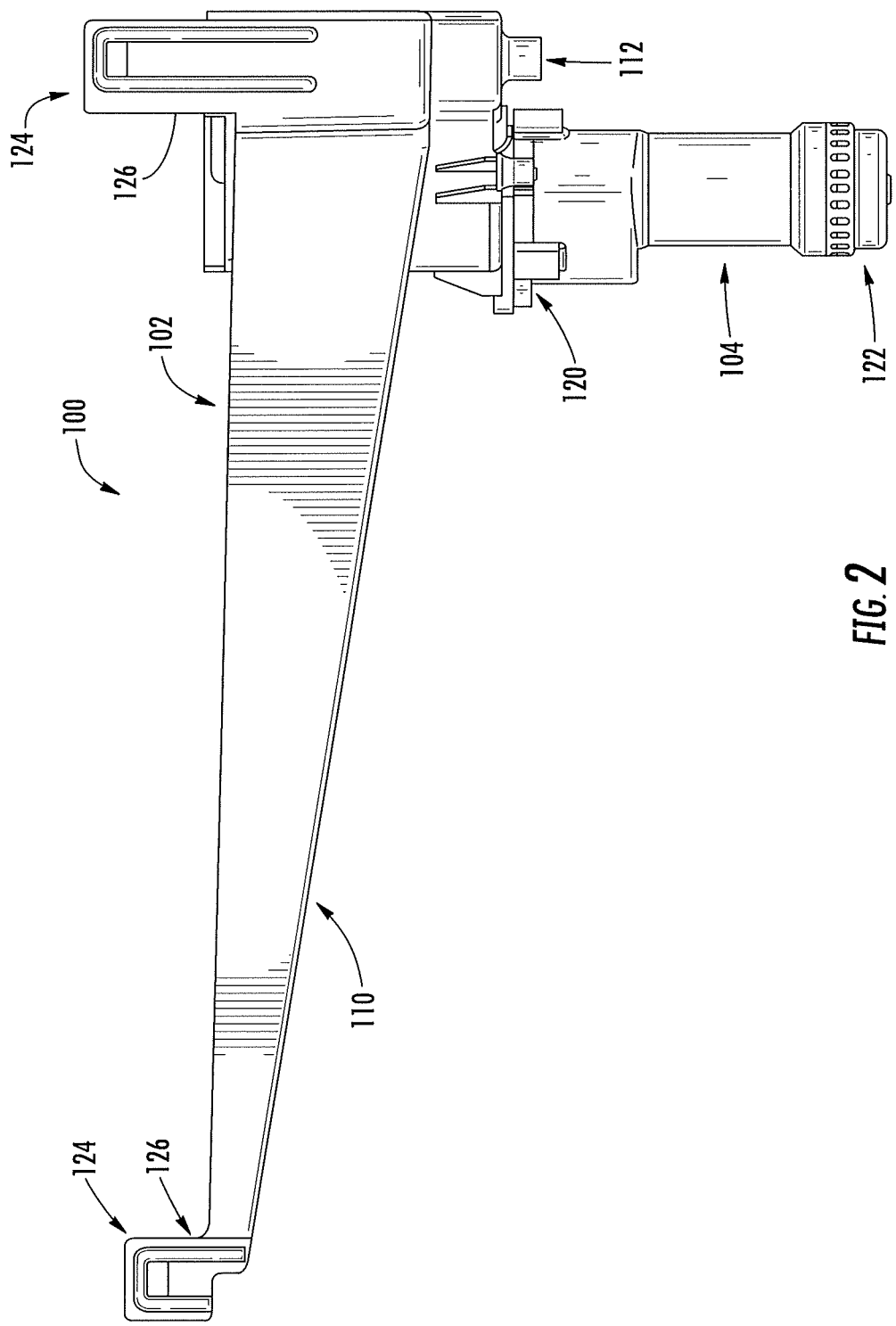
FIGS. 2, 3, and 4 illustrate a left side, front, and a right side view, respectively, of the exemplary retrofit kit for dynamically freezing flavored ice cubes from the flavored beverage.

FIG. 2 illustrates a left side view of the exemplary retrofit kit 100. The fluid-holding reservoir 102 may include one or more attachments 124 for attaching the retrofit kit 100 to an ice machine. The attachments 124 may include openings or other fasteners or integrated cantilevered snap features for fastening the fluid-holding reservoir 102 to an ice machine and that support the fluid-holding reservoir 102 vertically, and/or horizontally or level to the level on which the equipment resides. The retrofit kit 100 may replace the water holding tank/reservoir of an existing ice machine. The attachments 124 may each include a vertical arm 126 extending from the fluid-holding reservoir 102 and that include fasteners or openings configured to be coupled with the ice machine. The inlet 112 and the outlet (not shown in FIG. 2), may be configured to be coupled with outlet and inlet hose lines of the ice machine, respectively.

The motor pack 104 may include a motor cover 122 at the bottom of the motor pack 104. The motor cover 122 may be removable and configured to allow access to components inside of the motor pack 104, such as an electric motor and other electronics inside of the motor pack 104. The motor pack 104 may be fastened to the bottom exterior of the fluid-holding reservoir 102 via one or more fasteners 120, such as screws or bolts.

Figure 3:
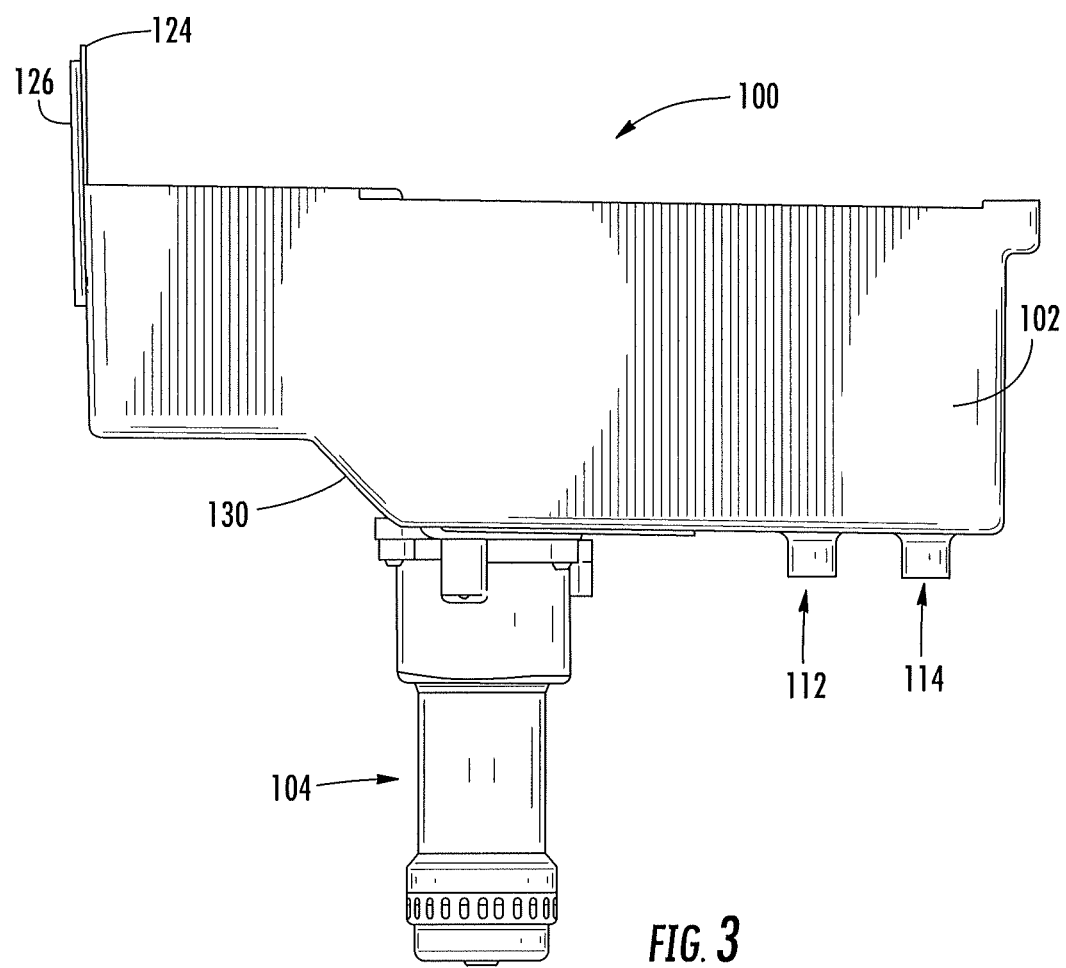

FIG. 3 illustrates a front view of the exemplary retrofit kit 100. As shown, the vertical arm 126 of the attachment 124 may extend vertically from the fluid-holding reservoir 102. The fluid-holding reservoir 102 may have an angled portion 130 that lowers the bottom of the fluid-holding reservoir 102 as compared with the inclined slide. The angled portion 130 may lower the bottom of the fluid-holding reservoir 102 via a 45 degree downward incline.

Figure 4:
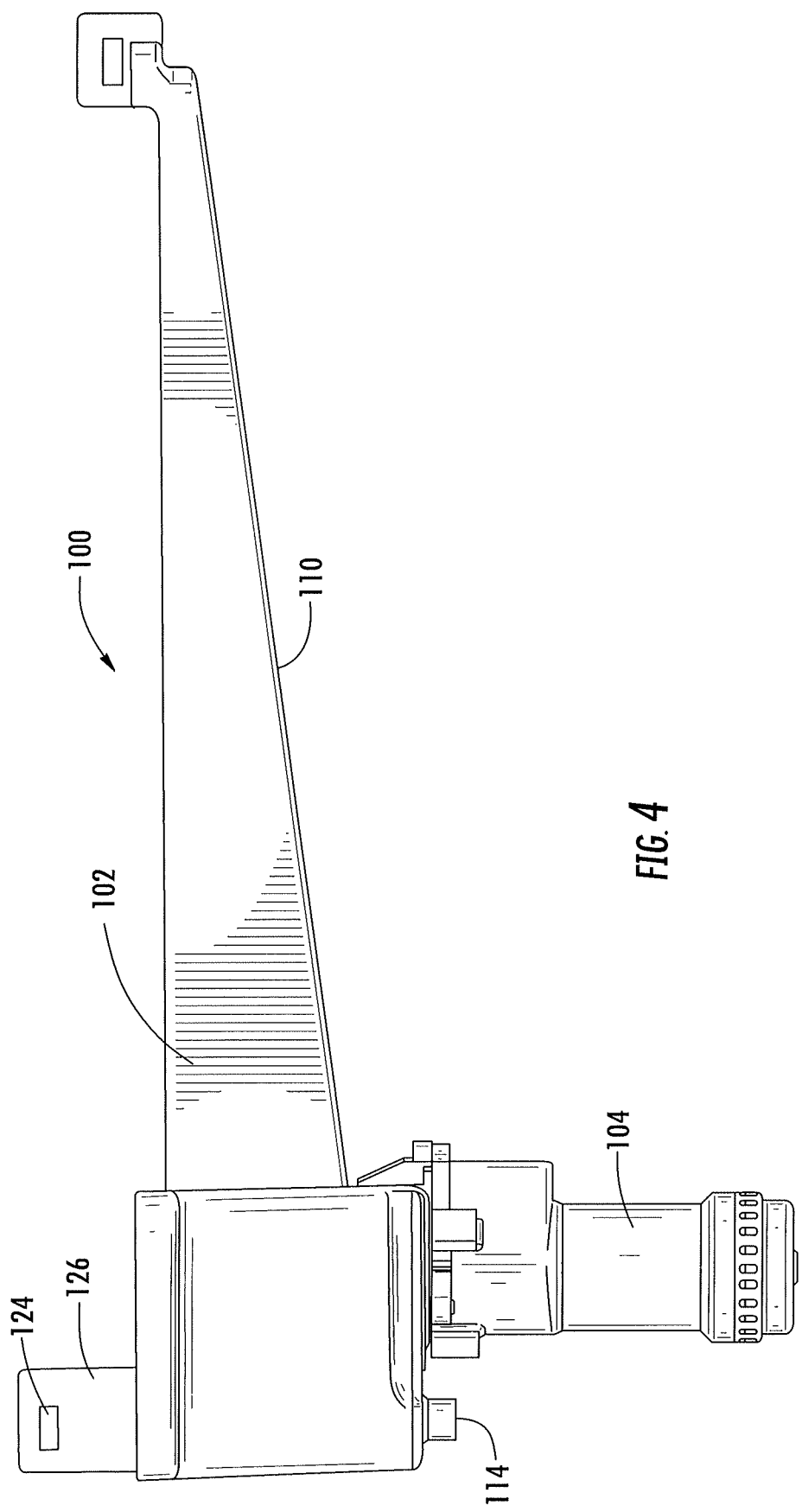

FIG. 4 illustrates a right side view of the exemplary retrofit kit 100. The outlet 114 from the fluid-holding reservoir 102 may feed flavored liquid being held in the fluid-holding reservoir 102 to the ice machine. The outlet 114 may be accepted by or coupled to hosing or piping associated with the inlet of the ice machine and make a fluid-tight connection with the inlet of the ice machine. The inclined slide 110 may have a downwardly inclined bottom running into a central or main liquid holding portion of the fluid-holding reservoir 102.

Figure 5:
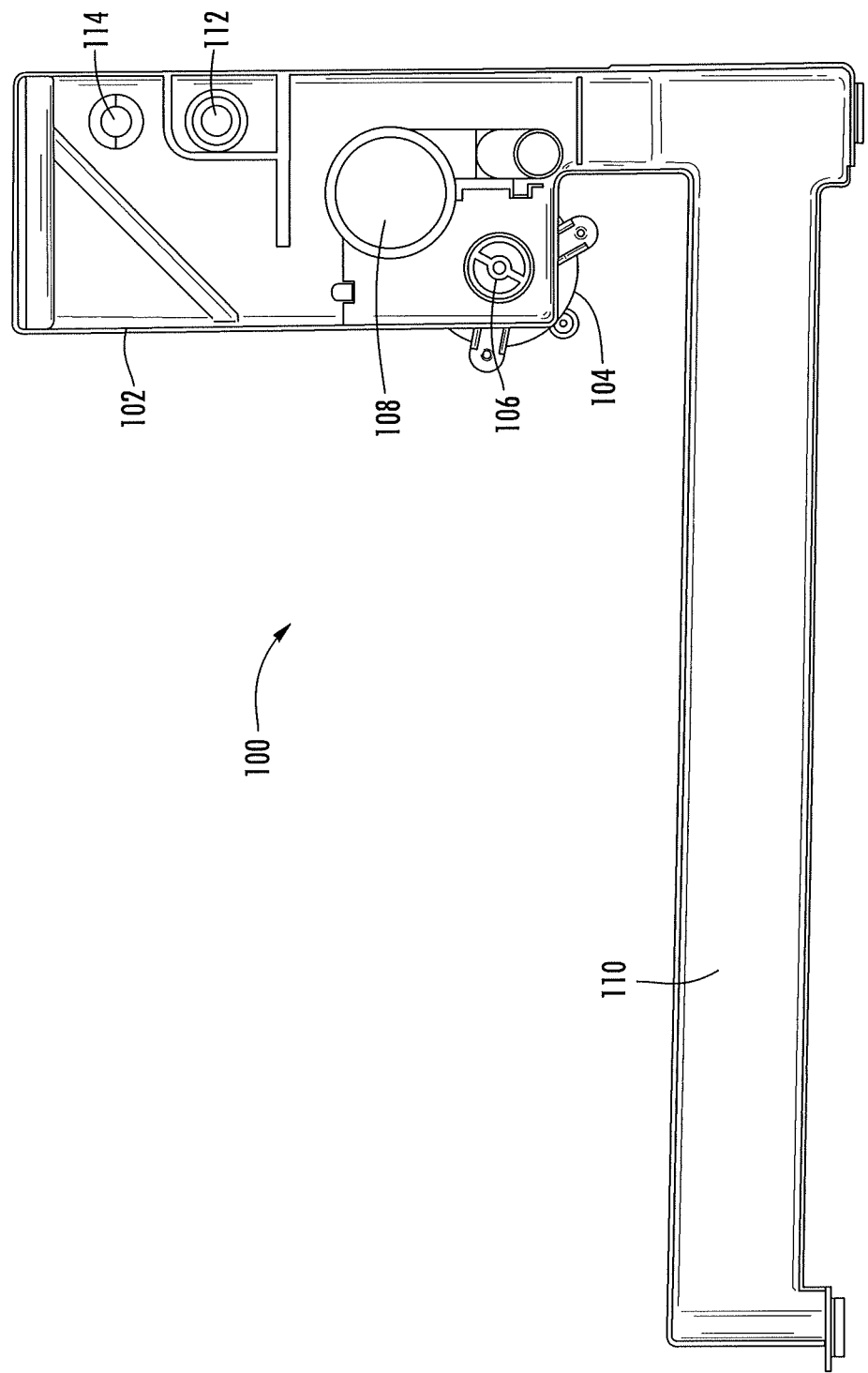
FIGS. 5 and 6 illustrate a top and a bottom view, respectively, of the exemplary retrofit kit for dynamically freezing flavored ice cubes from the flavored beverage.

FIG. 5 illustrates a top view of the exemplary retrofit kit 100. The positioning of the mixing attachment 106, the pump 108, the inclined slide 110, the inlet 112 from the Flojet™ pump (and external fluid reservoir), and the outlet 114 from the fluid-holding reservoir 102 to the ice machine within the fluid-holding reservoir 102 is depicted. Other positioning of the components internal to the fluid-holding reservoir 102 may be used.

The pump 108 may be used to pump the flavored liquid being held by the fluid-holding reservoir 102 into the ice machine via the outlet 114. The outlet 114 may be attached in a fluid tight manner to a fluid inlet to the ice machine. The pump 108 may also facilitate suctioning flavored liquid in the ice machine back into the fluid-holding reservoir 102.

The mixing attachment 106 may be coupled with the motor pack 104 through a wall in the fluid-holding reservoir 102. The motor pack 104 may cause the mixing attachment 106 or a component thereof to move or rotate. The movement of the mixing attachment 106 or component thereof may facilitate mixing the flavored liquid during an ice-making or freezing cycle of the ice machine.

In one embodiment, the mixing attachment 106 may include a rotatable, cylindrical exterior body. The exterior body may have fins or arms configured for stirring the flavored liquid. Preferably, the exterior body includes a helical or other auger. As a result, when the motor pack 104 is energized, the helical auger of the mixing attachment 106 may rotate.

The helical auger may facilitate mixing the flavored liquid vertically and/or horizontally within the fluid-holding reservoir 102. In one embodiment, the auger 106 may be positioned vertically within the fluid-holding reservoir 102. During use, the auger 106 may be rotated during an ice-making cycle of the ice machine, and move the flavored liquid in an upwardly or downwardly direction within the fluid-holding reservoir 102 to mix the flavored liquid. Other configurations may be used.

Figure 6:
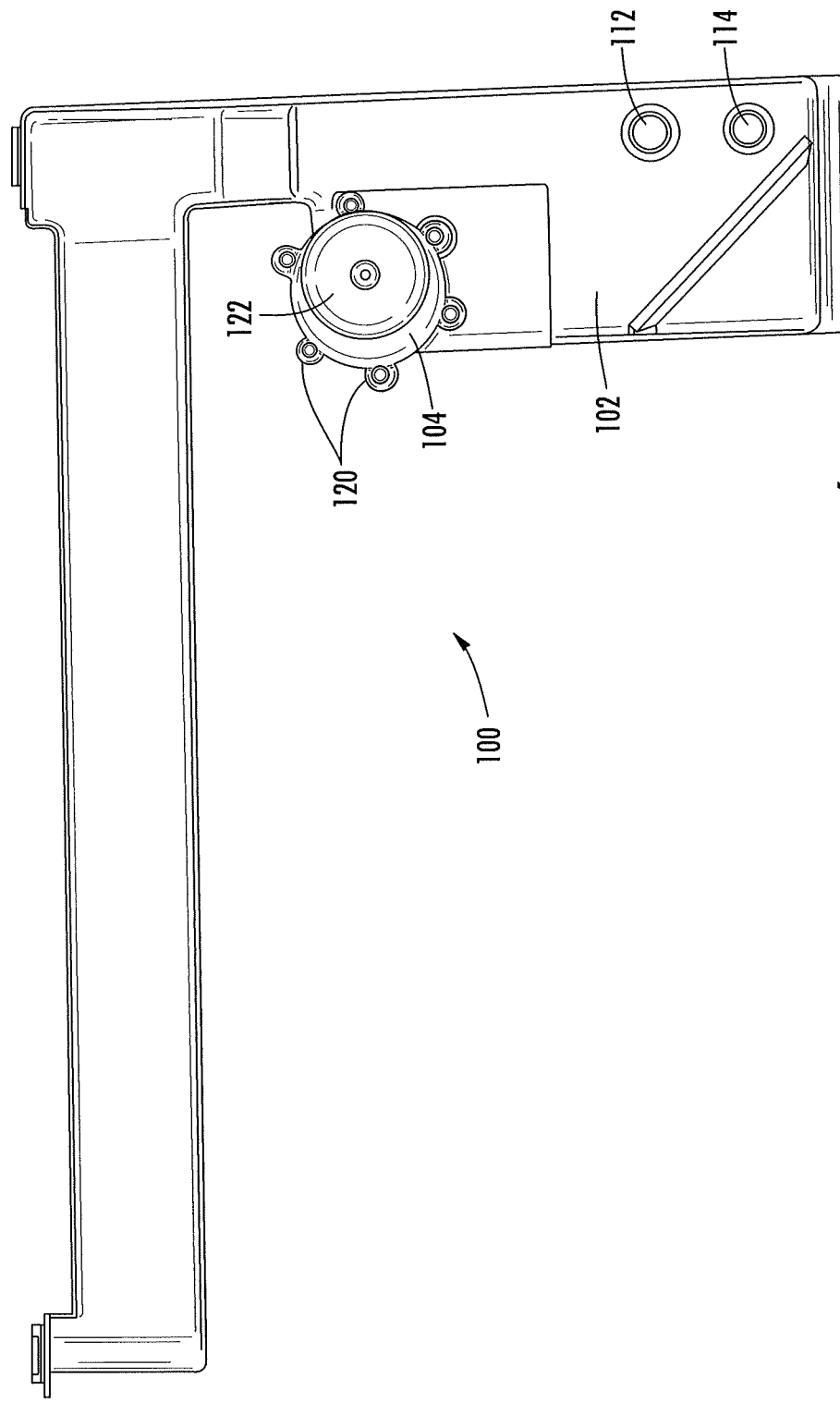

FIG. 6 illustrates a bottom view of the exemplary retrofit kit 100. As shown, the motor pack 104 may include an end-cap 122. The motor pack 104 may be attached to the fluid-holding reservoir 102 via several fasteners 120, such as bolts and screws. The motor pack 104 may be coupled to the fluid-holding reservoir 102 in a fluid tight manner to prevent leakage of the flavored liquid from the fluid-holding reservoir 102. The retrofit kit may include additional, fewer, or alternate components.

It should be noted that with either type of system, dynamic freezing or static freezing, each may have an external reservoir and an internal reservoir of liquid to be frozen. The external reservoir in either case might be a 5 gallon jug and may be pumped into the internal reservoir by means of a Flojet™ or other pump.

In the case of the dynamic freezing, the internal reservoir may be the reservoir that the pump and motor are attached to inside of the ice maker (see discussion of FIG. 7 below). Once the internal reservoir is filled with the amount of coffee required for a single batch of ice, the internal pump may cycle the coffee from the internal reservoir to the top of the cooled plate. The coffee may flow down the plate by means of gravity and back into the internal reservoir. And the cycle may continue until harvest. On the other hand, in the case of static freezing, the internal reservoir may be the ice tray, or mold. In this case, the coffee may remain stagnant until harvest.

FIG. 7 illustrates an exemplary dynamic freezing process 700. The dynamic freezing process 700 may include using an ice machine 702, an exterior reservoir 704, an internal reservoir 706, an external pump 708, a mixing motor 710, an internal pump 712, a cold plate 714, an ice bin 716, a syphon 718, external liquid (such as coffee) 720, and internal liquid (such as coffee) 722. The dynamic freezing process 700 may include additional, fewer, or alternate components.

The dynamic freezing process 700 may include an external reservoir 704 filled with a liquid, such as coffee 720. An external pump, such as a Flojet™ pump 708 may syphon the coffee 720 from the external reservoir 704 and direct the coffee 720 into an internal reservoir 706. The coffee 722 in the internal reservoir 706 may be continuously mixed by a mixing motor 710. The coffee 722 in the internal reservoir 706 may be pumped by the internal pump 712 onto and/or over the cold plate 714 to dynamically make ice and/or ice cubes. The resulting coffee ice and/or ice cubes may be collected in an ice bin 716.

The internal reservoir 706 may have an inlet 112 and an outlet 114 (such as shown in FIG. 1). The inlet 112 and outlet 114 may be located adjacent to one another, or alternatively at opposite ends of the internal reservoir 706.

The inlet 112 may be located on the bottom of the internal reservoir 706 and may accept fluid from the Flojet™ pump 708. Alternatively, the fluid may be dispensed directly into the internal reservoir 706 similar to a faucet on a sink.

The outlet 114 may be from the internal pump 712 where the fluid is pumped to the top of the cold plate 714, dispensed on the cold plate 714, and then gravity fed back into the internal reservoir 706. Preferably, the outlet 114 is located at the lowest point of the internal reservoir 706. Otherwise, there may be a pool of fluid that would never get pumped.

As shown, the dynamic freezing process may include both an internal and an exterior reservoir. The static freezing processes described herein may also include both an internal and an exterior reservoir.

B. Exemplary Dynamic Freezing Method of Making Flavored Ice

A method of dynamically freezing a flavored liquid to making flavored ice may be provided. The method may include placing, or otherwise directing, a flavored liquid into a fluid-holding reservoir. The flavored liquid may be colored, i.e., have a non-clear color. The method may include continuously imparting a swirling and/or vortex action on a first portion of the flavored liquid in the fluid-holding reservoir to continuously mix the first portion of the flavored liquid in the fluid-holding reservoir. The method may also include directing a second portion of the flavored liquid from the fluid-holding reservoir to an ice machine such that the ice machine makes flavored ice or ice cubes from the second portion of the flavored liquid during an ice-making cycle of the ice machine.

The swirling and/or vortex action imparted on the first portion of the flavored liquid in the fluid-holding reservoir may act to move some of the first portion of the flavored liquid in the fluid-holding reservoir from a bottom, or a vicinity thereof, of the fluid-holding reservoir toward a top, or a vicinity thereof, of the fluid-holding reservoir. The ice machine may make ice from the second portion of the flavored liquid being fed into the ice machine by repeatedly, or continuously, feeding/directing the second portion of the flavored liquid over a cold surface such that ice may be formed from the flavored liquid in layers upon the cold surface, similar to the formation of an icicle. The cold surface may be a horizontal, vertical, or inclined plate that is approximately equal to or less than the freezing point of the flavored liquid, such as approximately 32° F. for a water-based liquid mixture.

Figure 8:
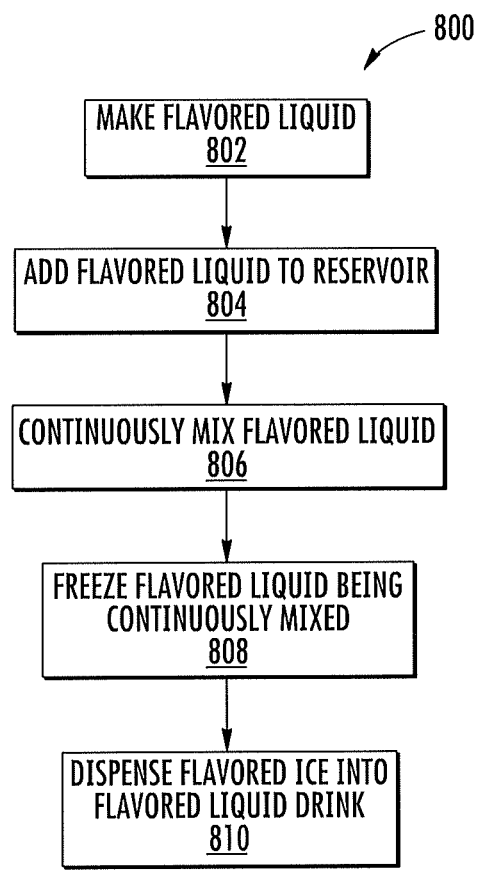
FIG. 8 illustrates an exemplary method of dynamically freezing a flavored beverage into flavored ice cubes.

FIG. 8 illustrates an exemplary method of making flavored ice from a flavored liquid 800. The method may include making a flavored liquid 802, adding the flavored liquid into a fluid-holding reservoir 804, continuously mixing the flavored liquid 806, freezing the flavored liquid that is being continuously mixed 808, and dispensing the flavored ice into a container containing a liquid portion of the flavored liquid 810. The method may include additional, fewer, or alternate actions, including those discussed herein.

The method 800 may include making a flavored liquid 802. The present embodiments may provide for a method of making a drink comprising water and another substance, such as coffee or colored/flavored juice, to make a "mixed drink," such as coffee, orange juice, or other flavored drinks, including those discussed elsewhere herein. The mixed drink may include a liquid component for drinking, and a frozen or iced component for keeping the liquid component cold as the user drinks the liquid component. The frozen component may comprise ice shavings or ice cubes made from the mixed drink to avoid diluting the taste of the mixed drink as the ice melts. As the ice melts, the amount of flavoring in the mixed drink may not become diluted, but rather may remain constant or substantially constant.

The method 800 may include adding or directing a flavored liquid into a fluid-holding reservoir 804 attached to an ice machine. The flavored liquid may include the mixed drinks discussed herein.

The method 800 may include continuously mixing the flavored liquid 806. A water reservoir from an existing ice machine may be modified to perform the mixing. A swirler or mixer may be added to the water reservoir.

In one embodiment, the swirler or mixer and/or the fluid-holding reservoir of the present embodiments may be part of a retrofit kit for an existing water reservoir. A pre-existing water reservoir may be retrofitted with a motorpack and mixing attachment. The swirler or mixer may include a small control box and may be turned by a rotor attached to an electric motor, or with a pump located within the fluid-holding reservoir. The flavored liquid may be mixed prior to and during a freezing cycle performed by an attached ice machine being fed the flavored liquid that is held in the fluid-holding reservoir.

The method 800 may include freezing the flavored liquid that is being continuously mixed 808. The flavored liquid being mixed in the fluid-holding reservoir may be directed over a cold plate, such as via a pump (see, e.g., FIG. 7). The method 800 may include dispensing the flavored ice into a container containing a liquid portion of the flavored liquid 810.

II. Exemplary Embodiments for Statically Freezing Colored Ice Cubes

Several variables may affect the freezing point of a liquid beverage. The freezing point may be affected by kinetic energy, stirring, movement, humidity, pressure, contents of the beverage, and other factors. During development, the inventors experimented with the continuously mixing of coffee during a dynamic freeze-cycle and running the coffee being continuously mixed over a cold plate, such as with the operation of certain conventional ice makers. However, it is believed that coffee particles suspended within the water displayed characteristics that made it difficult for the resulting ice cubes to be evenly colored using the dynamic freezing techniques experimented with (mainly due to freezing point depression). Thus, the inventors turned to statically freezing coffee to make coffee ice cubes of uniform coloring.

A. Exemplary Method of Statically Freezing Colored Ice Cubes

A computer-implemented method of dynamically controlling a static freeze-cycle of an ice cube maker may be provided. The method may include actively monitoring in real-time one or more variable inputs. In one aspect, the method may include, inter alia, (1) waiting for a limit switch to close; (2) turning a heater on to help facilitate the removal of colored ice cubes from an ice cube tray; (3) turning a motor on to turn a shaft with mechanical fingers; (4) waiting until the colored ice cubes are ejected from the ice cube tray by the mechanical fingers—as may be indicated by the mechanical fingers being returned to the twelve o'clock or other angular position; (5) electronically opening a solenoid valve to refill the ice cube tray with liquid beverage; (6) starting the next freeze-cycle; and/or (7) then dynamically adjusting the length of the static freeze-cycle based upon certain variables being continuously and actively monitored, such as freezer temperature.

In another aspect, the method may include detecting that a previous freeze-cycle of the ice cube maker has been completed via a processor; and then refilling an ice cube tray with a colored/flavored beverage by opening a solenoid valve via the processor. The colored/flavored beverage may have a non-clear color. The beverage include coffee, tea, soda, cola, juices, fruit drinks, and other drinks, including those discussed elsewhere herein.

The method may include commencing a current freeze-cycle of the ice cube maker to statically freeze the colored beverage in the ice cube tray by having the processor start measuring a length of time of the current freeze-cycle. The method may include receiving a current freezer temperature generated by a temperature sensor; and continuously and/or actively monitoring the current freezer temperature generated by the temperature sensor via the controller/processor.

If and when the current freezer temperature rises above a user-adjustable, controller determined, or other set-point temperature, the processor may stop counting the length of time of the current freeze-cycle until the current freezer temperature returns to back below the set-point temperature. At which time, the processor may resume measuring the length of time of the current freeze-cycle until the length of time of the current freeze-cycle reaches a set total-freeze-time—indicating that the current freeze-cycle is completed and/or that the colored liquid in the ice cube tray has been, or should have been, statically frozen into colored ice cubes. The method may further include measuring an amount of time that the current freezer temperature remains above the set-point temperature, and extending, via the processor, the set total-freeze-time that the current freeze-cycle is allowed to run by the amount of time that the current freezer temperature remains above the set-point temperature.

Figure 9:
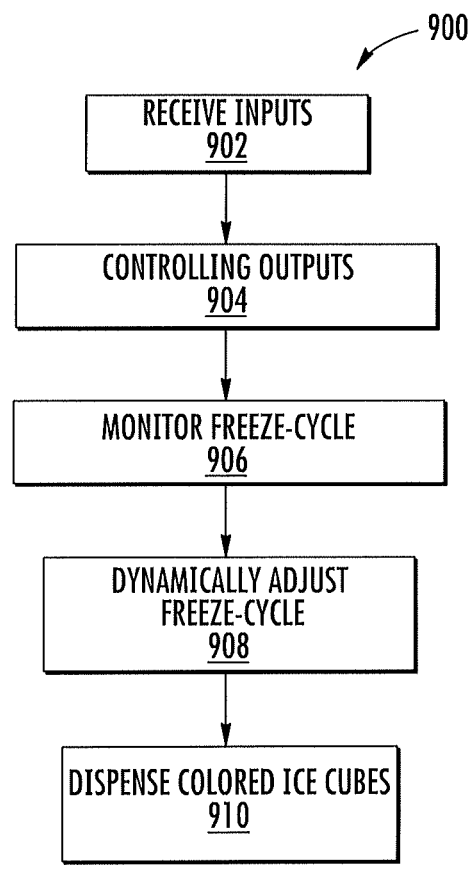
FIG. 9 illustrates an exemplary method of statically freezing a flavored beverage into colored ice cubes.

FIG. 9 illustrates an exemplary computer-implemented method of statically freezing a flavored beverage into colored ice cubes. The method 900 may include receiving one or more inputs 902; controlling several outputs 904; actively monitoring the freeze-cycle status or other parameters 906; dynamically adjusting the freeze-cycle 908; and ejecting or harvesting the colored ice cubes 910. The method may include additional, fewer, or alternate actions.

The method 900 may include receiving several inputs 902. A controller may include a processor that receives a signal indicating the position of a limit switch. The limit switch may close to indicate to the controller that the ice maker is at the end of a freeze-cycle, and/or ready to commence the next freeze-cycle.

During use, at the end of a freeze-cycle, the controller may energize a heater to facilitate separating the ice cubes from the ice cube tray. Shortly thereafter, the controller may also energize a motor that may turn the shaft with mechanical fingers, and the mechanical fingers may push the ice cubes out of the ice cube tray. The limit switch may indicate that the mechanical fingers have completely rotated, such as rotated a full 360°, and that the ice cubes have been ejected from the ice cube tray.

In one aspect, if the ice maker and/or freezer was de-energized, when the power is turned back on, the controller may run the motor until it sees the limit switch close, indicating the current angular position of the motor and/or the mechanical fingers on the shaft that is turned by the motor. To prevent this from occurring, an uninterruptible power supply (UPS) may be used to ensure that 120V, 60 Hz electric power is continuously provided to the electronics for a short period of time in the event of a temporary power outage. Furthermore, this will allow for the machine to be unplugged from the wall outlet, moved for cleaning the area underneath and around the machine, or ever for permanent relocation.

In another aspect, whenever the controller turns the motor on, the heater may also be turned on. As a result, if there is ice in the ice cube tray, eventually, the heater will free the ice, allowing the mechanical fingers to eject the ice cubes and permitting the motor to complete its cycle. And if there is no ice in the tray, the fingers will just cycle through unfrozen liquid. Once the motor completes its cycle, the mechanical fingers will return back to a home position, such as the twelve o'clock position. After the controller commences the next freeze-cycle, the limit switch may be re-opened.

In addition to the limit switch, the inputs to the controller may also include a signal from a temperature sensor. The temperature sensor may measure the freezer temperature and create an analog temperature signal. The analog temperature signal may then be converted into an eight, a ten, or other bit digital signal via an analog to digital (A/D) converter. The controller may continuously and/or actively monitor the temperature within the freezer, as well as the position of the limit switch.

The method 900 may include controlling the operation of several components via the processor 904. The controller may turn on and/or off various components as needed. For example, the computer controlled outputs may include the motor that turns the shaft. The shaft may have mechanical arms or fingers configured to eject ice cubes from an ice cube tray.

The computer controlled outputs may also include a heater. The heater may heat or slightly heat the mold to facilitate the mechanical fingers on the shaft freeing the ice cubes from the ice mold. During experimentation, it was found that coffee ice cubes may be stickier than water ice cubes. Thus, as compared with making water ice cubes, while making coffee ice cubes, the heater may have to be turned on longer to sufficiently free the coffee ice cubes, using the mechanical fingers, from the ice cube tray, which may be made from aluminum, plastic, or other material.

The computer controlled outputs may, also include a solenoid valve. The solenoid valve may be energized to refill the ice cube tray with the liquid beverage sought to be frozen into ice. Energizing the solenoid valve may open the solenoid valve to allow the liquid beverage to flow into the ice cube tray, such as from a large container of the beverage.

The method may include monitoring the freeze-cycle of an individual ice maker via the controller 906. The controller may continuously and/or actively monitor certain inputs, such as the limit switch, freezer temperature, freeze-cycle time, user set-point temperature, and other inputs. Once the ice cube tray has been refilled with the beverage and if the freezer temperature is below a set-point temperature, the controller may start a timer, clock, or counter measuring the length of the current freeze-cycle. The set-point temperature may be between the freezing point of the beverage being frozen, which may be below the freezing point of water, and the normal operating temperature of the freezer. Other set-point temperatures may be used based upon the liquids being statically frozen.

The method 900 may include dynamically adjusting the length of the freeze-cycle 908. The freeze-cycle may be stopped and/or extended based upon various inputs received and actively monitored, such as freezer temperature. The controller may be configured in a manner such that if the freezer temperature is greater than the set-point temperature, the counter or clock counting the length of the current freeze-cycle may be stopped, until such time as the freezer temperature returns to back below the set-point temperature.

The controller may also count the amount of time that the freezer temperature remains above the set-point temperature.

The controller may extend the allowable length of the freeze-cycle by that amount of time or a portion thereof—up to the max freeze cycle time.

The controller may further turn on/off various components if the freezer temperature remains above the set-point temperature. For example, the motor and the heater may be turned off, and the solenoid valve may be closed if the freezer temperature goes above the set-point temperature, which may indicate that the freezer door has been opened.

The method 900 may include dispensing the flavored ice cubes into a container containing a liquid portion of the flavored beverage 910. The colored beverage may be coffee, and the colored ice cubes may be coffee ice cubes. The set-point temperature may be below the freezing point of the coffee by any amount, such as 0.5° F., 1° F., 2° F., 3° F., 4° F., 5° F., 10° F., 15° F., or other amount. The method may include, once the controller determines that the current freeze-cycle is completed or has timed-out, the controller energizing a heater to facilitate separating the colored ice cubes from the ice cube tray. After energizing the heater for a short time, the controller may energize a motor to eject the colored ice cubes from the ice cube tray.

The method may also comprise serving the flavored ice cubes made from the flavored beverage into a container holding a, liquid portion of the flavored beverage. As a result, as the flavored ice cubes made from the flavored beverage melt, the flavoring of the liquid portion of the flavored beverage may not become diluted or substantially diluted.

B. Exemplary Controller

Figure 10:
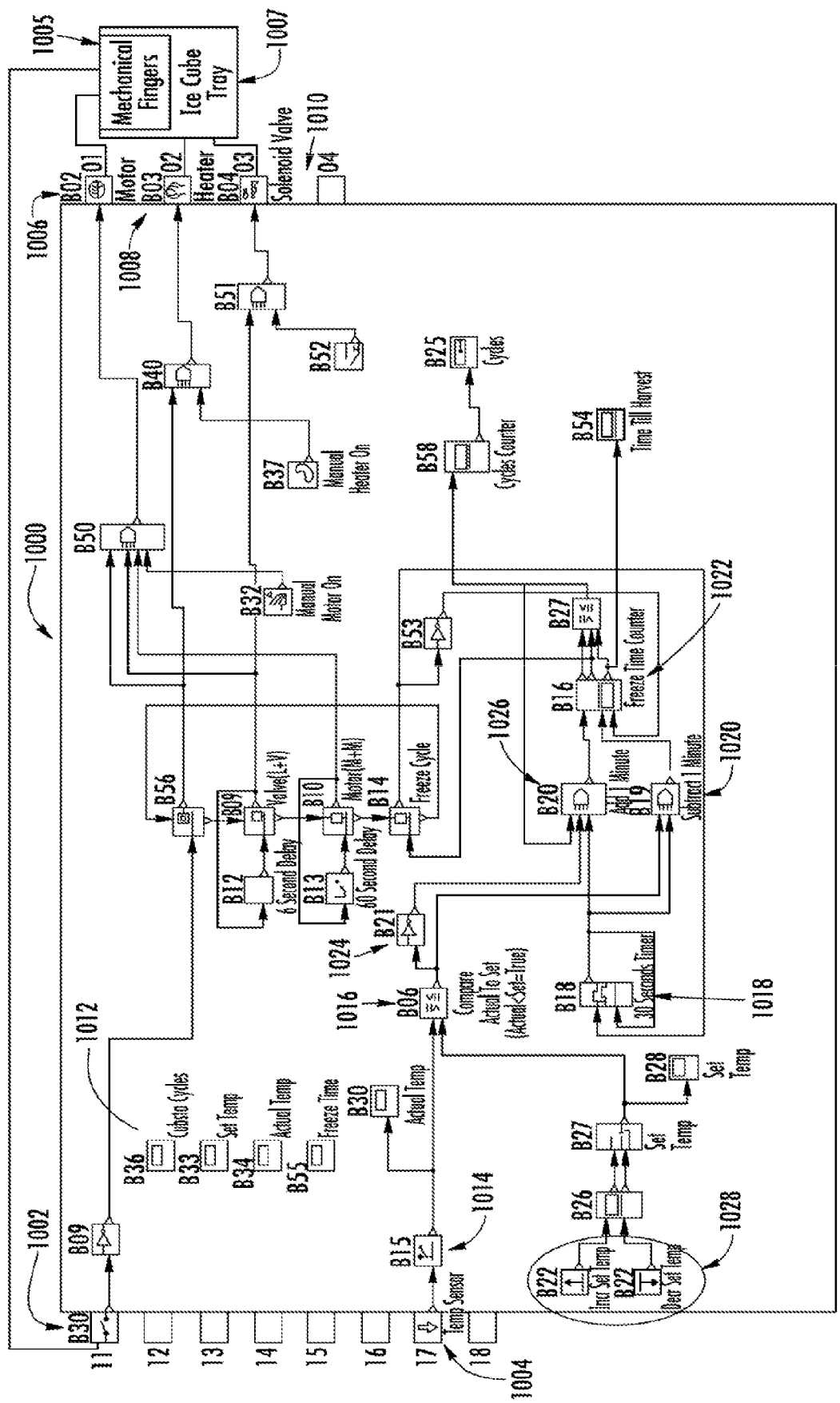
FIG. 10 illustrates a representation of a control diagram of a controller configured to dynamically control the freeze-cycle of an ice maker that is configured to statically freeze a flavored beverage into colored ice cubes.

FIG. 10 illustrates a representation of a control diagram 1000 configured to dynamically control the freeze-cycle of an ice maker that is configured to statically freeze a flavored beverage into colored ice cubes. The control diagram 1000 may be implemented via a controller having a processor and/or programmable logic.

The controller may actively monitor a number of inputs, including a limit switch 1002 and a temperature sensor 1004. Additional, fewer, or alternate inputs may be monitored.

The limit switch 1002 may close on various inputs, such as when the mechanical fingers 1005 on the shaft have returned to the twelve o'clock position. When the limit switch 1002 closes, the controller may receive a signal indicating that the next freeze-cycle is ready to begin. During operation, once the limit switch 1002 closes, the controller may then operate various mechanical components, such as a motor 1006, a heater 1008, and a solenoid valve 1010 (as discussed above). Additional, fewer, or alternate components may be operated.

In one embodiment, after the limit switch 1002 closes, the controller may energize the heater 1008. Energizing the heater 1008 may facilitating heating the ice cube tray 1007 and/or slightly melting the exterior of the frozen ice cubes such that they are easier to remove from the ice cube tray 1007. After the heater 1008 has been energized for a short period of time, the controller may energize the motor 1006. The motor 1006 may turn a shaft having mechanical fingers 1005 configured to eject the ice cubes from the ice cube tray 1007 and into a bin, such as a bin at the bottom of the freezer. The motor 1006 may be turned on for 60 seconds, or other time periods, after the heater 1008 ha been energized a sufficient amount of time to allow for freeing up the ice cubes from the ice cube tray 1007.

Once the motor 1006 has completed its cycle of rotation. the controller may energize the solenoid valve 1010. Energizing the solenoid valve 1010 may open the solenoid valve 1010 and allow liquid beverage to flow into the ice cube tray 1007. The controller may energize the solenoid valve 1010 for six seconds, or other time periods, to allow an appropriate amount of beverage to flow into the ice cube tray 1007.

After the solenoid valve 1010 is de-energized, the controller may commence the current freeze-cycle. If the freezer temperature is determined by the controller to be less than a set-point temperature, the controller may start a running timer or a "freeze time counter" that measures the length of the current freeze-cycle, starting with zero. Otherwise, the controller may wait until the freezer temperature drops, as the freezer continues to run, to below the set-point temperature to commence counting the length of the current freeze-cycle.

The controller may be interconnected with a digital display screen 1012 with various control buttons that allow a user to change various parameters. The display screen 1012 may display the number of freeze-cycles performed by the ice maker, the set-point temperature, the actual temperature within the freezer, a current freeze time (i.e., the length of the current freeze-cycle), a time until harvest (i.e., the expected time left in the current freeze-cycle), and/or other parameters.

The temperature sensor 1004 may feed an A/D converter 1014 to generate a digital "actual temperature" signal representing the freezer temperature. The "actual temperature" signal may be displayed on the display screen, and also be fed into a comparator 1016. The comparator 1016 may compare the "actual temperature" to the set-point temperature, which may be manually increased or decreased Via buttons on the display screen 1012. Buttons 1028 may be used by an operator to manually increase or decrease the set-point temperature.

If the actual temperature is less than the set-point temperature, the comparator 1016 may generate a true signal, such as a digital 1 or analog 5 Volts. When the actual temperature is less than the set-point temperature, the controller may continue to subtract accumulated time from the time remaining in the current freeze-cycle.

In one embodiment, a freeze time counter may represent the amount of time left in the current freeze-cycle. For every 60 seconds that the comparator 1016 generates a true signal, the controller may subtract one minute from the remaining "freeze time." The controller may include a 60 seconds timer 1018 configured to send a signal to a subtractor 1020 that adjusts a freeze time counter 1022 downward by a minute for every 60 seconds that the actual temperature remains below the set-point temperature. Other time periods may be used, such as every second, 10 seconds, 30 seconds, etc.

The comparator 1016 may feed an inverter or a "not" block 1024, which in turn feeds an adder 1026. If the actual temperature is greater than the set-point temperature, such as when the freezer door has been opened during use, the comparator 1016 may generate a false signal, such as a digital 0 or analog 0 Volts. However, the adder 1026 may see the opposite, i.e., a digital 1 or analog 5 Volts. The adder 1026 may also receive a signal from the 60 seconds timer 1018 such that the adder 1026 adjusts the freeze time counter 1022 upward (or otherwise extends the current freeze-cycle) by a minute for every 60 seconds that the actual freezer temperature remains above the set-point temperature. Other time periods may be used to extend the current freeze-cycle, such as every second, 10 seconds, 30 seconds, etc.

In one embodiment, when the freeze time counter 1022 (discussed above), that may count downward and initially be set to a given amount of total freeze time, reaches zero, the controller may determine that the current freeze-cycle is completed. Additionally or alternatively, the controller may compare a freeze time counter that counts upward with a total-freeze-cycle time limit. Once the freeze time counter , representing the length of time of the current freeze-cycle, reaches the total-freeze-cycle time limit, the controller may determine that the current freeze-cycle has been completed and/or that the beverage in the ice cube tray 1007 should have been in the freezer a sufficient amount time such that the beverage has been statically frozen into ice cubes.

In one embodiment, the total-freeze-cycle time limit may be approximately 38 minutes or other time periods. The time periods may be user adjustable via a display and control buttons. As an example, if the current freeze-cycle has been going on for 35 minutes, the controller may allow the current freeze-cycle to continue. Once, the controller determines that the current freeze-cycle has been running for 38 minutes (the set freeze-cycle length or max freeze cycle), the controller may determine that the current freeze-cycle is complete, and may actuate the motor and heater, which, in turn, close the limit switch indicating such. The controller may then turn on the heater, subsequently energize the motor, and then open the solenoid valve (as discussed above) in preparation of commencing of the next freeze-cycle.

The controller may be configured to not start the clock measuring the current freeze cycle until the freezer temperature is below or reaches the set-point temperature, such as 15° F. Preferably, it may be extra cold in the freezer, i.e., well below the freezing point of the beverage, prior to the controller starting/resuming counting down the amount of time left in the freeze-cycle.

The controller may continuously monitor and compare the current length of time of the current freeze-cycle, for example, 35 minutes, with the preset freeze-cycle time limit, such as 38 minutes. The display may be configured to display the time remaining in the current freeze-cycle, such as 3 minutes. Once the current length of time of the current freeze-cycle reaches the preset freeze-cycle time limit, the controller may end the freeze-cycle.

The freezer may be configured to have a defrost cycle, such as a 15-20 minute long defrost cycle. However, unlike conventional freezers that contain frozen food, there may be little or no ice in the freezer to keep it cold in the defrost cycle. Thus, depending upon the amount of ice in the freezer, more or less time in the defrost cycle may be desirable. As the amount of ice in the freezer changes, the conditions within the freezer changes as well. Thus, the present embodiments that dynamically adjust the length of the freeze-cycle may be desirable.

In one aspect, the control algorithm may use a fixed freeze cycle time for any temperature below a set-point temperature. In another aspect, the control algorithm may dynamically adjust the freeze cycle time based upon how far below and/or above the set-point temperature the freeze temperature becomes. Alternate dynamic adjustments may be used.

III. Exemplary Vending Machine Embodiment

The embodiments disclosed herein may be used with various vending machine embodiments. An exemplary vending machine may be configured to provide various iced beverages having a liquid portion and an ice cube portion, both made from the same beverage. The beverage may be tea, orange juice, tomato juice, fruit juice, vegetable juice, lemonade, soda, milk, chocolate milk, and/or another beverage, including those discussed elsewhere herein.

In one embodiment, the vending machine may provide freshly brewed ice coffee. The vending machine may contain a self-contained brewing apparatus for brewing coffee, and may serve hot coffee or iced coffee, or both. The iced coffee may include coffee ice cubes made of the beverage coffee.

The vending machine may brew fresh coffee, and provide the hot coffee to customers as a hot coffee option. For instance, the vending machine may include a dedicated reservoir for holding freshly brewed coffee that is heated and/or insulated to maintain the coffee hot. A customer may select a "hot coffee" or other button on the vending machine, and then the vending machine may deliver hot coffee into a cup or other container positioned under a nozzle.

The vending machine may dispense the freshly brewed coffee into a second dedicated reservoir or other fluid holding tank. The second reservoir and the coffee therein, may also be heated, but preferably be slightly chilled or at room temperature.

After which, the brewed coffee in the second reservoir may be continuously mixed and directed into an ice machine for either dynamically or statically freezing the coffee into coffee ice cubes. The coffee ice cubes may be collected in an ice cube dispenser. A customer may select an "iced coffee" or other button on the vending machine. After which, the vending machine may dispense either coffee that is chilled or at room temperature, into a cup or other container, and then dispense coffee ice cubes into the cup or other container as well. As a result, chilled coffee may be kept cold by the coffee ice cubes as the customer drinks the coffee. Vending machines having additional, fewer, or alternate features may be used.

The arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description.

Therefore, it is intended that the disclosure not be limited to the particular arrangement(s) disclosed as the best mode contemplated for carrying out this invention, but that the invention will include all embodiments and arrangements falling within the scope of the appended claims.

What is claimed is:

1. A computer-implemented method of dynamically controlling a freeze-cycle of an ice cube maker, the method comprising:

starting the freeze-cycle of the ice cube maker to statically freeze a flavored beverage held within an ice cube tray into colored ice cubes, the flavored beverage having a non-clear color;

counting a current length of the freeze-cycle via a processor;

receiving a freezer temperature generated by a temperature sensor, the freezer temperature being a temperature of a freezer in which the ice cube maker is located;

continuously monitoring the freezer temperature generated by the temperature sensor via the processor;

wherein the processor is configured to stop counting the current length of the freeze-cycle when the freezer temperature rises above a set-point temperature, and resume counting the current length of the freeze-cycle when the freezer temperature returns to back below the set-point temperature, and once the freeze-cycle is determined to be completed by the processor, the processor energizes a motor configured to eject colored ice cubes made from statically freezing the flavored beverage during the freeze-cycle from the ice cube tray into an ice cube bin.

2. The computer-implemented method of dynamically controlling a freeze-cycle of an ice cube maker of claim 1, wherein the processor is further configured to count an amount of time that the freezer temperature remains above the set-point temperature, and extends a total length of the freeze-cycle by the amount of time that the freezer temperature remained above the set-point temperature.

3. The computer-implemented method of dynamically controlling a freeze-cycle of an ice cube maker of claim 2, wherein the set-point temperature is below the freezing point of the flavored beverage.

4. The computer-implemented method of dynamically controlling a freeze-cycle of an ice cube maker of claim 2, wherein the flavored beverage is coffee and the colored ice cubes made from the flavored beverage are coffee ice cubes.

5. The computer-implemented method of dynamically controlling a freeze-cycle of an ice cube maker of claim 1, wherein the set-point temperature is below the freezing point of the flavored beverage.

6. The computer-implemented method of dynamically controlling a freeze-cycle of an ice cube maker of claim 1, wherein the processor is further configured to control an opening of a solenoid valve to fill the ice cube tray with the flavored beverage.

7. The computer-implemented method of dynamically controlling a freeze-cycle of an ice cube maker of claim 1, wherein the motor turns a shaft having mechanical fingers configured to eject colored ice cubes from the ice cube tray.

8. The computer-implemented method of dynamically controlling a freeze-cycle of an ice cube maker of claim 7, wherein the processor is further configured to control a heater to facilitate ejection of the colored ice cubes from the ice cube tray after the completion of the freeze-cycle.

9. A computer-implemented method of dynamically controlling a freeze-cycle of an ice cube maker, the method comprising:
    detecting that a previous freeze-cycle of the ice cube maker has been completed via a processor;
    refilling an ice cube tray with a colored beverage by opening a solenoid valve via the processor, the colored beverage having a non-clear color;
    commencing a current freeze-cycle of the ice cube maker to statically freeze the colored beverage in the ice cube tray by having the processor start measuring a length of time of the current freeze-cycle;
    receiving a current freezer temperature generated by a temperature sensor;
    continuously monitoring the current freezer temperature generated by the temperature sensor via the processor; and
    wherein when the current freezer temperature rises above a set-point, the processor stops counting the length of time of the current freeze-cycle until the current freezer temperature returns to below the set-point, at which point, the processor resumes measuring the length of time of the current freeze-cycle until the length of time of the current freeze-cycle reaches a set total-freeze-time indicating that the current freeze-cycle is completed and/or that the colored beverage in the ice cube tray has been statically frozen into colored ice cubes.

10. The computer-implemented method of dynamically controlling a freeze-cycle of an ice cube maker of claim 9, the method further comprising:
    measuring an amount of time that the current freezer temperature remains above the set-point, and extending, via the processor, the set total-freeze-time that the current freeze-cycle is allowed to run by the amount of time that the current freezer temperature remains above the set-point via the processor.

11. The computer-implemented method of dynamically controlling a freeze-cycle of an ice cube maker of claim 10, wherein the colored beverage is coffee and the colored ice cubes are coffee ice cubes.

12. The computer-implemented method of dynamically controlling a freeze-cycle of an ice cube maker of claim 11, wherein the set-point is below the freezing point of the coffee.

13. The computer-implemented method of dynamically controlling a freeze-cycle of an ice cube maker of claim 10, wherein once the processor determines that the current freeze-cycle is completed, the processor is configured to energize a motor to turn a shaft with mechanical fingers that eject the colored ice cubes from the ice cube tray.

14. The computer-implemented method of dynamically controlling a freeze-cycle of an ice cube maker of claim 13, wherein once the processor determines that the current freeze-cycle is completed, the processor is configured to energize a heater to facilitate separating the colored ice cubes from the ice cube tray.

15. An ice machine for dynamically changing a freeze-cycle of an ice maker for statically freezing ice cubes, the ice machine including:
    a limit switch configured to indicate that a previous freeze-cycle of the ice maker is complete;
    a temperature sensor configured to generate a current freezer temperature of a freezer in which the ice maker is located;
    a solenoid valve configured to refill an ice cube tray with a colored beverage to be statically frozen into colored ice cubes; and
    a processor configured to monitor the limit switch and the current freezer temperature generated by the temperature sensor, and when the limit switch indicates that a previous freeze-cycle of the ice maker is completed, the processor opens the solenoid valve to refill the ice cube tray with the colored beverage and starts a current freeze-cycle of the ice maker by starting to count time upward from zero with a counter,
    wherein when the processor determines that the current freezer temperature received from the temperature sensor is above a set-point temperature, the processor stops the counter, and when the processor subsequently determines that the current freezer temperature received from the temperature sensor has returned to back below the set-point temperature, the processor resumes counting time with the counter until the counter reaches a predetermined total freeze-cycle length indicating that the colored beverage in the ice cube tray has been statically frozen into colored ice cubes.

16. The ice machine for dynamically changing a freeze-cycle for statically freezing ice cubes of claim 15, wherein the processor measures an amount of time that the current freezer temperature remains above the set-point temperature and extends the predetermined total freeze-cycle length by the amount of time that the current freezer temperature remains above the set-point temperature.

17. The ice machine for dynamically changing a freeze-cycle for statically freezing ice cubes of claim 16, wherein the colored beverage is coffee and the colored ice cubes are coffee ice cubes.

18. The ice machine for dynamically changing a freeze-cycle for statically freezing ice cubes of claim 17, wherein the set-point temperature is below a freezing point of the coffee.

19. The ice machine for dynamically changing a freeze-cycle for statically freezing ice cubes of claim 16, wherein once the processor determines that the current freeze-cycle is completed, the processor is configured to energize a motor to turn a shaft having mechanical fingers that eject the colored ice cubes from the ice cube tray.

20. The ice machine for dynamically changing a freeze-cycle for statically freezing ice cubes of claim 19, wherein once the processor determines that the current freeze-cycle is completed, the processor is configured to energize a heater to facilitate separating the colored ice cubes from the ice cube tray.

\* \* \* \* \*